No. 854,910. PATENTED MAY 28, 1907.
W. J. POSAKONY.
FLY TRAP FOR ATTACHMENT TO WINDOWS.
APPLICATION FILED NOV. 1, 1906.

Witnesses:
K. K. Keffer
A. Anderson

Inventor: William J. Posakony
By Thomas G. Orwig, Attorney.

UNITED STATES PATENT OFFICE.

WILLIAM J. POSAKONY, OF POCAHONTAS, IOWA.

FLY-TRAP FOR ATTACHMENT TO WINDOWS.

No. 854,910.  Specification of Letters Patent.  Patented May 28, 1907.

Application filed November 1, 1906. Serial No. 342,167.

*To all whom it may concern:*

Be it known that I, WILLIAM J. POSAKONY, a citizen of the United States, residing at Pocahontas, in the county of Pocahontas and State of Iowa, have invented a new and useful Fly-Trap for Attachment to Windows, of which the following is a specification.

My object is to provide a fly trap adapted to be detachably connected with the inside of a window in such a manner that flies will be induced thereby to enter the trap.

My invention consists in the construction and application of the device as hereinafter set forth, pointed out in my claims and illustrated in the accompanying drawings in which—

Figure 1:
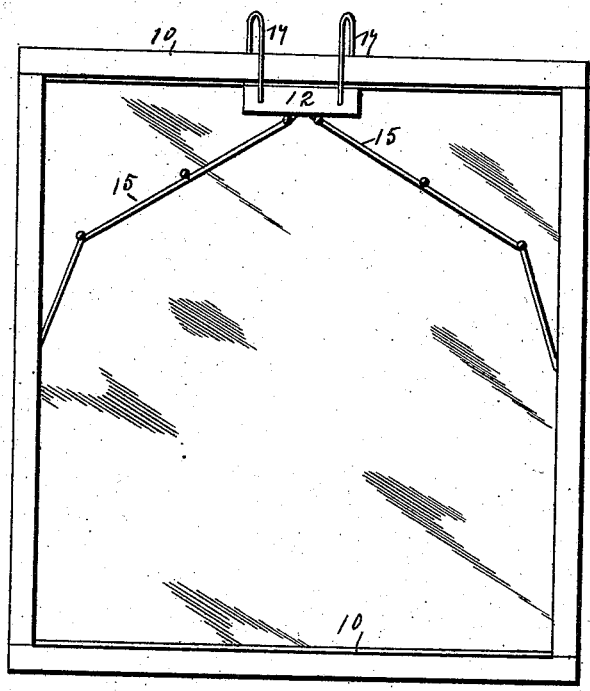
Figure 2:
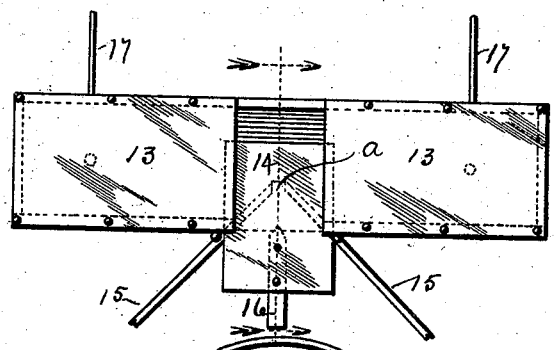
Figure 3:
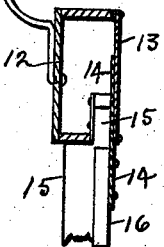

Figure 1 shows the device detachably connected with a window sash and the glass in the sash as required for practical use. Fig. 2 is an enlarged view of the trap and shows it open as required to allow flies to pass from the window glass into the trap. Fig. 3 is a transverse sectional view on the line $x$ $x$ of Fig. 2.

The numeral 10 designates a window sash and 12 the trap in the form of an oblong box made of thin wood or other suitable opaque material. Its front face portions are closed with mica plates 13, or other suitable transparent material, and to its center is fitted a slide 14 of the same material for opening and closing the trap.

In the underside and center of the trap is a passageway $a$ to admit flies and in the ends of the passage are fixed, in inclined positions, as shown, guides 15, made of wood. They are far enough apart at their tops to allow flies that ascend on the guides to pass therefrom into the trap.

The guides are preferably formed in sections and hinged together at their ends so they can be readily folded upon the trap as required to facilitate packing, storing and shipping the trap advantageously.

For closing the passageway through which flies enter the trap between the top ends of the inclined guides 15, a plug 16 is fixed to the inside face of the slide 14 and beveled at its top in reverse ways so it will engage the undersides of the top end portions of the guides 15. The lower end of the plug projects below the slide 14 and serves as a handle for moving the slide up and down.

Hooks 17 are connected with the rear closed side of the trap for detachably connecting the trap with a window sash as shown in Fig. 1 in such a manner that light will enter the trap through its transparent face that contacts with the window glass.

In the practical use of my invention suitable bait may be placed in the trap to attract flies. But bait is not actually necessary because when flies light on a window they instinctively crawl upward and when they reach the wooden guides 15 they will ascend thereon to be directed thereby into the trap where they will remain to die, or they may be removed by taking the trap from the window and withdrawing the slide 14 to let them escape out of doors, or by killing them by immersing the trap in water and then emptying the water and flies.

Having thus set forth the construction of my invention and the manner of its application and use the practical utility thereof is obvious.

What I claim as new and desire to secure by Letters-Patent, is:—

1. A fly trap consisting of an oblong box having a transparent front, an opening in the front, a slide for closing the opening, an opening in the bottom and guides fixed therein to extend downward and inclined in reverse ways and means for closing the opening between the tops of the guides.

2. A fly trap consisting of an oblong box having a transparent front, an opening in the front, a slide for closing the opening, an opening in the bottom guides fixed therein to extend downward and inclined in reverse ways and a plug fixed to the slide to engage the upper ends of the guides as set forth.

3. A fly trap consisting of an oblong box having a transparent front, an opening in the front, a slide for closing the opening, an opening in the bottom and guides fixed therein to extend downward and inclined in reverse ways and a plug fixed to the slide for engaging the tops of the guides and means for detachably connecting the trap with a window.

4. A fly trap attachment for windows comprising an oblong box made of opaque material and its front of transparent material, an opening at the center of the front, a slide for closing the opening, an opening in the bottom of the box and jointed guides fixed therein to extend downward and inclined in reverse ways, a plug fixed to the slide for engaging the inclined guides and hooks fixed to the trap for connecting it with a window, to operate as set forth.

WILLIAM J. POSAKONY.

Witnesses:
R. O. GROVER,
J. A. SMEK.